(12) United States Patent
Maslov et al.

(10) Patent No.: US 7,537,070 B2
(45) Date of Patent: May 26, 2009

(54) AUTONOMOUS PORTABLE RANGE EXTENDER

(75) Inventors: Boris A. Maslov, Reston, VA (US); Chahee Peter Cho, Lansdale, PA (US); Eun S. Kim, Centreville, VA (US)

(73) Assignee: BluWav Systems LLC, Rochester Hills, MI (US)

( * ) Notice: Subject to any disclaimer, the term of this patent is extended or adjusted under 35 U.S.C. 154(b) by 552 days.

(21) Appl. No.: 10/872,785

(22) Filed: Jun. 22, 2004

(65) Prior Publication Data

US 2005/0279542 A1    Dec. 22, 2005

(51) Int. Cl.
*B60K 6/00* (2007.10)

(52) U.S. Cl. .................................... 180/65.2; 180/65.4

(58) Field of Classification Search ................ 180/65.1, 180/65.2, 65.8, 76, 65.4; 60/571, 524, 39.6
See application file for complete search history.

(56) References Cited

U.S. PATENT DOCUMENTS

| | | | |
|---|---|---|---|
| 2,898,542 A | 8/1959 | Wasko et al. | |
| 3,340,748 A | 9/1967 | Young | |
| 3,604,406 A * | 9/1971 | Hottelet | 123/44 D |
| 3,719,881 A | 3/1973 | Shibata | |
| 4,022,083 A | 5/1977 | Pollak-Banda et al. | |
| 4,106,603 A | 8/1978 | Walter | |
| 4,165,795 A | 8/1979 | Lynch et al. | |
| 4,199,037 A | 4/1980 | White | |
| 4,293,281 A * | 10/1981 | Lamoreaux | 417/9 |
| 4,392,393 A | 7/1983 | Montgomery | |
| 4,533,011 A | 8/1985 | Heidemeyer et al. | |
| 4,540,888 A | 9/1985 | Drewry et al. | |
| 4,556,247 A | 12/1985 | Mahaffey | |
| 4,595,841 A | 6/1986 | Yaguchi | |
| 4,647,835 A | 3/1987 | Fujikawa et al. | |
| 4,835,405 A | 5/1989 | Clancey et al. | |
| 4,941,854 A * | 7/1990 | Takahashi et al. | 440/1 |

(Continued)

FOREIGN PATENT DOCUMENTS

DE    4032606 A1    3/1992

(Continued)

*Primary Examiner*—Christopher P Ellis
*Assistant Examiner*—Bridget Avery
(74) *Attorney, Agent, or Firm*—Alex Porat; Magna International Inc.

(57) ABSTRACT

A portable range extender can be used to supply electrical power to an electric vehicle operable by an electric traction motor. The portable range extender includes an engine, a dynamoelectric machine coupled to the engine by a shaft, an autonomous range extender controller for controlling operations of the range extender independently of a controller for the vehicle, and circuitry associated with the engine and machine. The range extender and its controlling circuitry are self contained within an enclosure. The enclosure is partitioned to form two sections, a first section housing the dynamoelectric machine and the second section housing the engine. Windows in the enclosure provide a path for air cooling of the range extender components. Air cooling is facilitated by a first set of cooling fins mounted on the rotor of the dynamoelectric machine at an end proximate an air inlet window, a second set of cooling fins mounted on the rotor of the dynamoelectric machine in the vicinity of an opening in the partition, and a third set of cooling fins mounted on the engine at the opposite side of the partition opening.

31 Claims, 5 Drawing Sheets

U.S. PATENT DOCUMENTS

| | | | |
|---|---|---|---|
| 4,961,403 A | 10/1990 | Kawaguchi et al. | |
| 5,081,365 A | 1/1992 | Field et al. | |
| 5,253,891 A | 10/1993 | Carlin et al. | |
| 5,264,764 A | 11/1993 | Kuang | |
| 5,397,922 A * | 3/1995 | Paul et al. | 290/1 A |
| 5,441,122 A * | 8/1995 | Yoshida | 180/65.2 |
| 5,614,809 A * | 3/1997 | Kiuchi et al. | 322/11 |
| 5,898,282 A | 4/1999 | Drozdz et al. | |
| 5,899,174 A * | 5/1999 | Anderson et al. | 123/2 |
| D416,858 S | 11/1999 | Domanski | |
| 6,018,200 A | 1/2000 | Anderson et al. | |
| 6,026,921 A | 2/2000 | Aoyama et al. | |
| 6,100,599 A | 8/2000 | Kouchi et al. | |
| 6,278,915 B1 | 8/2001 | Deguchi et al. | |
| 6,306,056 B1 | 10/2001 | Moore | |
| 6,333,620 B1 | 12/2001 | Schmitz et al. | |
| 6,362,533 B1 * | 3/2002 | Morohoshi et al. | 290/1 A |
| 6,390,215 B1 * | 5/2002 | Kodama et al. | 180/65.3 |
| 6,414,399 B1 | 7/2002 | Bianchi | |
| 6,421,599 B1 | 7/2002 | Lippa et al. | |
| 6,424,891 B1 | 7/2002 | Sargent et al. | |
| 6,474,068 B1 | 11/2002 | Abdel Jalil et al. | |
| 6,536,207 B1 * | 3/2003 | Kamen et al. | 60/39.6 |
| 6,547,527 B2 * | 4/2003 | Gaither | 417/16 |
| 6,608,393 B2 | 8/2003 | Anderson | |
| 6,622,804 B2 | 9/2003 | Schmitz et al. | |
| 6,639,511 B2 * | 10/2003 | Haruna et al. | 340/426.13 |
| 6,651,759 B1 | 11/2003 | Gruenwald et al. | |
| 6,660,967 B2 * | 12/2003 | Brofft et al. | 219/133 |
| 6,677,684 B1 | 1/2004 | Kennedy | |
| 6,722,458 B2 | 4/2004 | Hofbauer | |
| 6,745,117 B1 | 6/2004 | Thacher et al. | |
| 6,753,620 B2 | 6/2004 | Fukuda | |
| 6,762,525 B1 * | 7/2004 | Maslov et al. | 310/112 |
| 6,784,560 B2 | 8/2004 | Sugimoto et al. | |
| 6,849,961 B2 | 2/2005 | Takizawa et al. | |
| 6,877,581 B2 | 4/2005 | Badr et al. | |
| 6,894,625 B1 | 5/2005 | Kozma et al. | |
| 6,938,400 B2 * | 9/2005 | Fillman et al. | 56/10.6 |
| 7,005,756 B2 * | 2/2006 | Westerbeke, Jr. | 290/1 A |
| 7,119,450 B2 | 10/2006 | Albrecht | |
| 7,224,132 B2 | 5/2007 | Cho et al. | |
| 2002/0123836 A1 | 9/2002 | Komiyama et al. | |
| 2004/0011918 A1 | 1/2004 | Musial et al. | |
| 2005/0179262 A1 | 8/2005 | Cho et al. | |
| 2006/0157987 A1 | 7/2006 | Albrecht | |
| 2007/0050119 A1 | 3/2007 | Tamai et al. | |

FOREIGN PATENT DOCUMENTS

| | | |
|---|---|---|
| DE | 19641254 A1 | 4/1998 |
| EP | 0698521 A1 | 2/1996 |
| EP | 1329351 A1 | 7/2003 |
| GB | 1129709 | 10/1968 |
| WO | WO00/74964 A1 | 12/2000 |

* cited by examiner

AUTONOMOUS PORTABLE RANGE EXTENDER

RELATED APPLICATIONS

This application is related to U.S. application Ser. Nos. 10/761,313 and 10/779,600.

FIELD OF THE INVENTION

The present invention relates to electric power supply devices, and more particularly, to portable stand-alone electric power supply devices that can be utilized as range extenders for electric vehicles.

BACKGROUND ART

A typical range extender is provided as an integral part of a hybrid electric vehicle to improve its travel range. For example, U.S. Pat. No. 5,264,764 discloses a hybrid electric vehicle comprising an inverter/motor electric drive system, a vehicle controller, a range extender and a traction battery. The inverter/motor electric drive system is composed of an electric motor and an inverter/motor control unit. In response to a hand or foot actuated speed control actuator, a vehicle controller applies a torque command signal to the electric motor to drive the vehicle wheels through a transmission. The range extender, which includes an internal combustion engine and an alternator, is actuated by the vehicle controller to provide electric power to the inverter/motor drive system and/or the traction battery. The internal combustion engine rotationally drives the alternator to output electric power, which is applied to recharge the traction battery or to energize the motor. The inverter/motor control unit is responsive to the torque command signal to provide sufficient electric power from the traction battery and/or the range extender to the electric motor to drive the vehicle at a desired speed.

Another example of a range extender incorporated in a hybrid electric vehicle is disclosed in U.S. Pat. Nos. 6,622,804 and 6,333,620, which describe a series type hybrid electric vehicle including electric motors powered by a battery array, a vehicle control unit, an internal combustion engine and a generator driven by the internal combustion engine for charging the battery array. The internal combustion engine is controlled by the vehicle control unit to run continuously during operation of the vehicle. The charging of the battery array by the generator is controlled by the vehicle control unit depending on a driving mode of the vehicle, e.g., in accordance with power output, power consumption and rpm of the electric motors. The power generated by the generator is generally maintained constant but may be decreased if the state-of-charge of the battery array approaches an upper control limit at which the battery array may be overcharged, and may be increased if the state-of-charge approaches a lower control limit at which the battery array would be unable to drive the electric motors with enough torque to propel the vehicle appropriately.

The above-described systems are typical of a range extender that is designed specifically for the hybrid electric vehicle in which the range extender is installed. The range extender is controlled by the vehicle controller to interact with the electric motor of the vehicle. In a hybrid vehicle, the electric motor is used primarily for low-speed cruising or to provide extra power for acceleration or hill climbing. When braking or coasting to a stop, the hybrid vehicle uses its electric motor as a generator to produce electricity, which is then stored in its battery pack. Thus, the electric motor in hybrid vehicles improves fuel economy compared to a vehicle equipped only with an internal combustion engine. Unlike all-electric vehicles, which have a limited travel range and create inconvenience for users by requiring frequent recharging at charging sites, hybrid vehicles do not need to be plugged into an external source of electricity to charge batteries.

However, hybrid vehicles present challenges to be addressed in order to be suitable for widespread implementation. For economic feasibility of the hybrid vehicle, which can be more expensive than a non-hybrid vehicle, cost should be minimized and advantages should be attained from other vehicle operational considerations. Emissions caused by the internal combustion engine should be reduced or eliminated if possible. The weight and size considerations involved with the use of both electric motor propulsion and an internal combustion engine with its fuel supply are important factors in vehicles such as compact cars and trucks.

Hybrid vehicles and all-electric vehicles each have their advantages and disadvantages. Each type of vehicle obtains benefits from the provision of a range extender. The need exists for a portable range extender that can be electrically connected to an all-electric vehicle to enable the vehicle to travel longer distances, if necessary. For shorter travel distances that do not require range extender functionality, it would be desirable to avoid the weight of, and space occupied by, the unused range extender. Portability of a range extender would make it amenable to support vehicles of different types and be movable readily from one vehicle to another. Thus, it would be desirable to develop an autonomous portable range extender that is operable independently of the controller of a vehicle. The need exists for a range extender, including controller that can be contained in its own enclosure that can be transported to any user site. The enclosure and elements therein should provide appropriate cooling for the contained range extender components.

Minimization of weight of a range extender is of significant importance, not only to contribute to efficiency of operation of an all-electric or hybrid vehicle, but to enhance the portability of the range extender. The range extender thus should be equipped with an electric machine that can produce torque at as high a level as possible. High torque capability can effect high electrical output from generator operation, as well as efficient engine starting in motoring operation. Such machine would be lighter in weight than less efficient machines and eliminate a separate starter motor and the additional weight thereof.

DISCLOSURE OF THE INVENTION

The present invention fulfills the above described needs, at least in part, by provision of a portable range extender capable of supplying electrical energy to a vehicle. The range extender includes a dynamoelectric machine coupled to an internal combustion engine by a shaft. The dynamoelectric machine may be connected to a power source, such as a vehicle battery, to operate as a motor to drive the shaft in rotation when a user initiates starting of the engine. During a running mode of the engine, the engine performs as a prime mover to drive the dynamoelectric machine as a generator. Electrical output of the generator is supplied to a load. Although the power generated by the range controller may be applied to charge the vehicle battery and/or drive the vehicle traction motor and supply other electrical loads of the vehicle, the range controller operations are under the control of an autonomous controller.

Preferably, the dynamoelectric machine stator comprises a plurality of ferromagnetically isolated separate core segments that surround the rotor and is spaced therefrom by a radial air gap. Advantages of such machine are described, for example, in U.S. Pat. No. 6,492,756, issued Dec. 10, 2002 to Maslov et al.. As described in that patent, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects from interaction with other electromagnet members. High torque can be produced in a motoring mode and high energy output can be obtained in a generating mode. Thus, the bulk and weight of a dynamo electric machine that can be used to provide appropriate range extender performance can be minimized.

The range extender and its controlling circuitry are self contained within an enclosure that is independent of a vehicle with which it may be used. The enclosure contains a partition that divides the enclosure into two sections, a first section housing the dynamoelectric machine and the second section housing the engine. A cool air inlet window of the enclosure in the dynamoelectric machine compartment and an air outlet window in the engine compartment provides a path for air cooling of the range extender components. Cool air can be forced from the inlet into the first section, through the dynamoelectric machine, through an opening in the partition to the second section and thus to the engine, and then forced to the air outlet window. Air cooling is facilitated by a first set of cooling fins mounted on the rotor of the dynamoelectric machine at an end proximate the air inlet window, a second set of cooling fins mounted on the rotor of the dynamoelectric machine in the vicinity of the partition, and a third set of cooling fins mounted on the engine at the opposite side of the partition opening. The first set of cooling fins is configured to direct air radially outwardly, the second set of cooling fins is configured to direct air radially inwardly, and the third set of cooling fins is configured to direct air radially outwardly. This cooling arrangement provides beneficial advantage as the air is directed around and through the ferromagnetically isolated separate stator core segments to maximize cooling of the machine. The air outlet window of the enclosure is in communication with an engine exhaust pipe to provide egress of engine exhaust gas from the enclosure.

The enclosure includes a cover portion that can be moved from contact with a body portion to provide opening to compartments and user access to the components contained therein. The enclosure further may contain one or more latches for releasably securing the cover portion to the body portion. A cover sensor can be provided with the latch for signal communication with the controller to inhibit range extender operation if the cover portion is not in proper contact with the body portion. For example, a contact switch or a magnetic switch can be used as an appropriate sensor.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
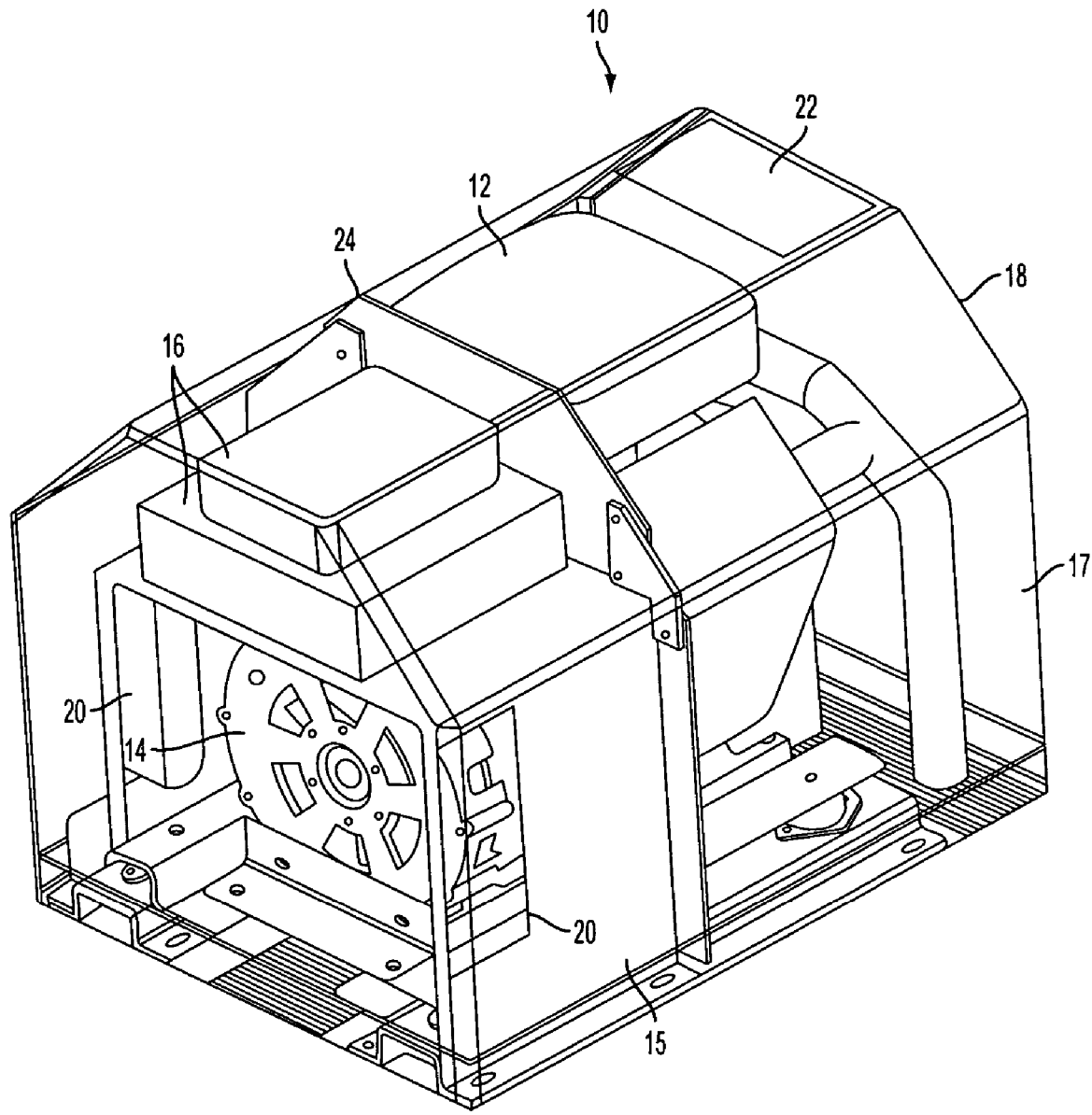
FIG. 1 is a perspective view of range extender elements configured in a preferred embodiment of the present invention.

FIG. 1 exemplifies a portable range extender 10 of the present invention. Prime mover 12, preferably an internal combustion engine, is coupled to dynamoelectric machine 14 by a common shaft. A controller and associated control circuitry are contained in a housing, the control system collectively indicated by reference numeral 16. As described further hereinafter, the control system is effective to control operations of both the engine 12 and the dynamoelectric machine 14. When operation of the range extender is initiated, the dynamoelectric machine 14 is controlled to operate as a motor for starting the engine 12. When prescribed engine conditions are detected, the control system 16 controls the dynamoelectric machine 14 to operate as a generator driven by the engine 12 to produce electrical power supplied to an external load. As a consequence of this control arrangement, there is no necessity for a separate starter motor for the engine, which is commonly provided in conventional motor-generator sets. The three phase machine, which provides considerably more power than a conventional starter motor, can drive the engine at a higher speed in the starting mode and eliminates the need for a separate flywheel.

Figure 2:
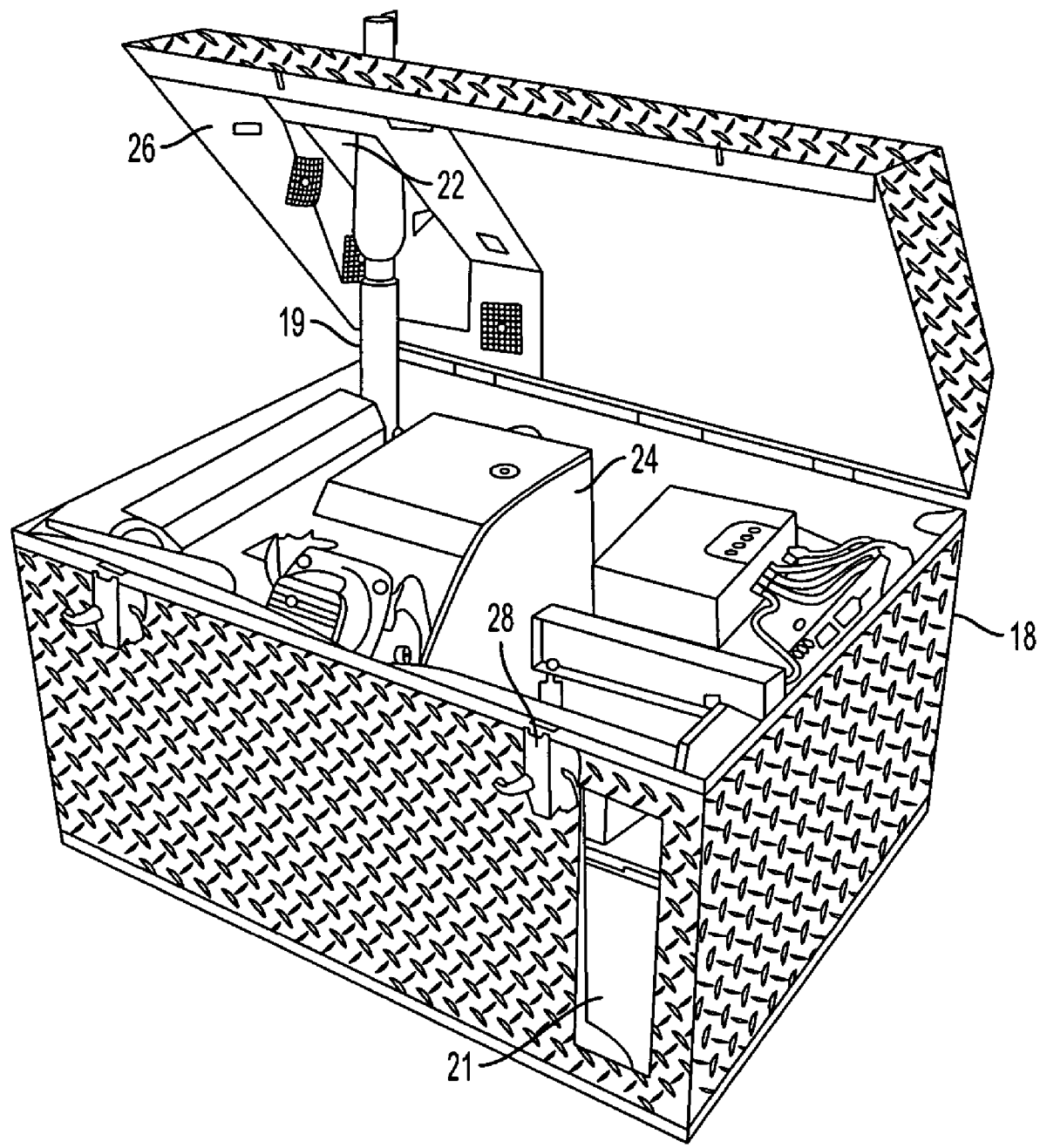
FIG. 2 is a view of the range extender elements of FIG. 1 shown with its enclosure.

Thus, the range extender 10 may be packaged in a compact integrated assembly covered by an enclosure 18, shown in phantom in FIG. 1, and further illustrated in FIG. 2. Within the enclosure, machine 14 and engine 12 are each contained in respective compartments 15 and 17. The housing for engine 12 contains cool air inlet windows, one being indicated by reference numeral 20, in FIG. 1. The cool air inlet windows are in communication with corresponding windows 21 in the enclosure, as shown in FIG. 2. One or more hot air outlet windows 22 are provided in the enclosure. A partition 24 forms two chambers 15 and 17, respectively indicated in FIG. 1, for the electrical machine and the engine. This arrangement provides efficient cooling as the cool air is directed first to the relatively cooler machine 14 and then to the engine 12. Exhaust pipe 19 of the engine is provided egress through air outlet window 22. The enclosure is provided with a cover door 26 that easily may be opened to provide access for maintenance. The cover may be secured in its closed position by latches 28. The latches preferably include sensors, such as switches, in circuit with the controller to provide an input signal thereto when the cover is appropriately secured to the enclosure body. Range extender operation is inhibited in the absence of such signal.

Figure 3:
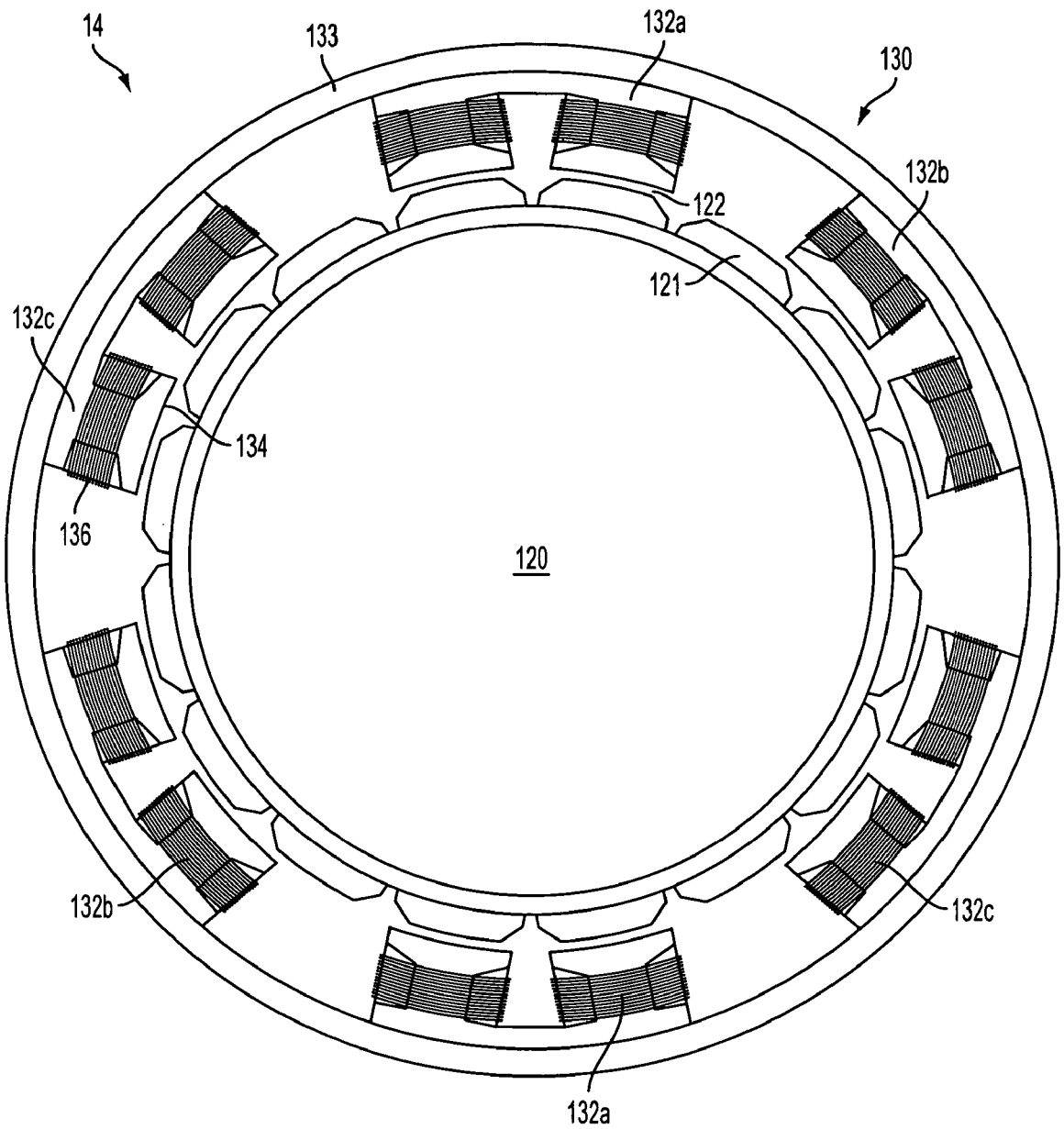
FIG. 3 is an exemplary view showing rotor and stator elements in a configuration that may be employed in the present invention.

The dynamoelectric machine 14 preferably may be a three phase AC electric machine, although other electrical machines may be employed. As illustrated in FIG. 3, rotor 120 is surrounded by stator 130, the rotor and stator being separated by radial air gap 122. The rotor may be configured as a solid or annular ring structure joined to the shaft. Permanent magnets 121, successively alternating in magnetic polarity, are substantially evenly distributed along the rotor periphery. Three sets of separated stator phase core components 132a, 132b, 132c are mounted on a non-magnetic support housing 133 and distributed along the air gap to form an annular ring configuration. Each core segment comprises a generally u-shaped magnetic structure that forms two poles having surfaces 134 facing the air gap. The legs of the pole pairs are wound with windings 136, although the core segment may be constructed to accommodate a single winding formed on a portion linking the pole pair. Each stator electromagnet core structure is separate, and magnetically isolated, from adjacent stator core elements. This configuration eliminates emanation of stray transformer flux effects from adjacent stator pole groups. The stator electromagnets are thus autonomous units comprising respective stator phases. Reference is made to the above described Maslov et al. patent, which is incorporated herein, for a more detailed description. The use of two core segments per phase is merely exemplary.

Figure 4:
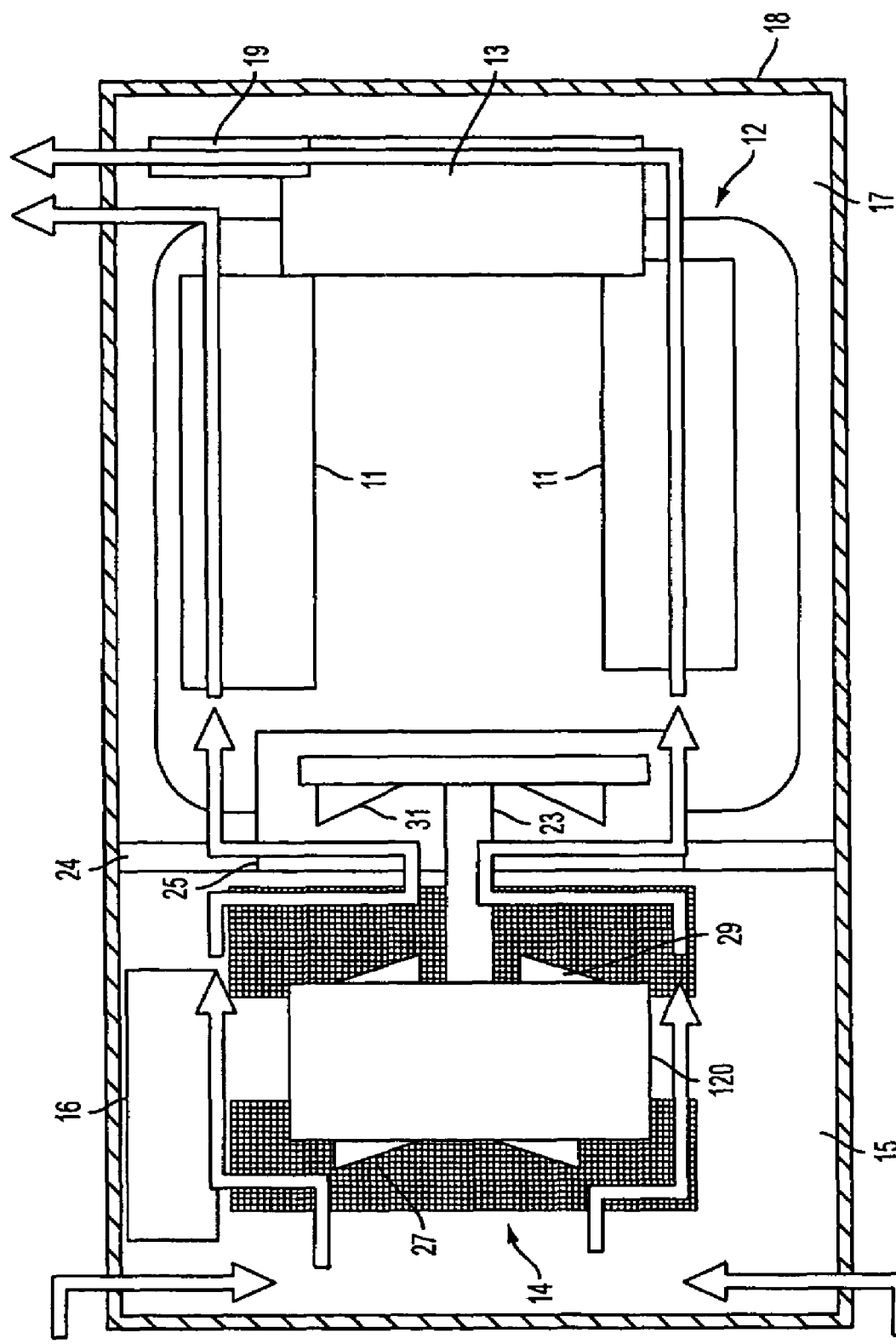
FIG. 4 is a schematic diagram illustrating the cooling arrangement of the range extender.

FIG. 4 is a schematic diagram illustrating the cooling arrangement of the range extender. Partition 24 divides the enclosure between machine compartment 15 and engine compartment 17. Engine compartment 15 contains controller 16, rotor 120 and stator 130. In the engine compartment 17 are illustrated the engine 12, including engine overhead areas 11, muffler 13, and exhaust pipe 19. The exhaust pipe is ported to the air outlet window 22. The machine rotor 120 and the engine 12 are each coupled to shaft 23. Opening 25 in partition 24 provides for connection of the shaft between the machine and the engine, as well as for air flow between chambers. A first set of cooling fins 27 is mounted on the rotor of the dynamoelectric machine at an end proximate the air inlet windows, a second set of cooling fins 29 is mounted on the rotor of the dynamoelectric machine in the vicinity of the partition, and a third set of cooling fins 31 is mounted on the engine at the opposite side of the partition opening. The first set of cooling fins is configured to direct air radially outwardly, the second set of cooling fins is configured to direct air radially inwardly, and the third set of cooling fins is configured to direct air radially outwardly. In operation, cool air is forced from the air inlet windows into the machine chamber. Cooling fins 27 directs the air through the machine stator, forcing the air around and through the spaces between the stator core segments. Cooling fins 29 direct the air from the stator through opening 25 in the partition to the engine chamber. Engine cooling fins 31 direct the incoming air to the engine overhead areas from which the air is then forced to the air outlet window. This cooling arrangement provides beneficial advantage as the air is directed around and through the ferromagnetically isolated separate stator core segments to maximize cooling of the machine. The air outlet window of the enclosure is in communication with an engine exhaust pipe to provide egress of engine exhaust gas from the enclosure.

Figure 5:
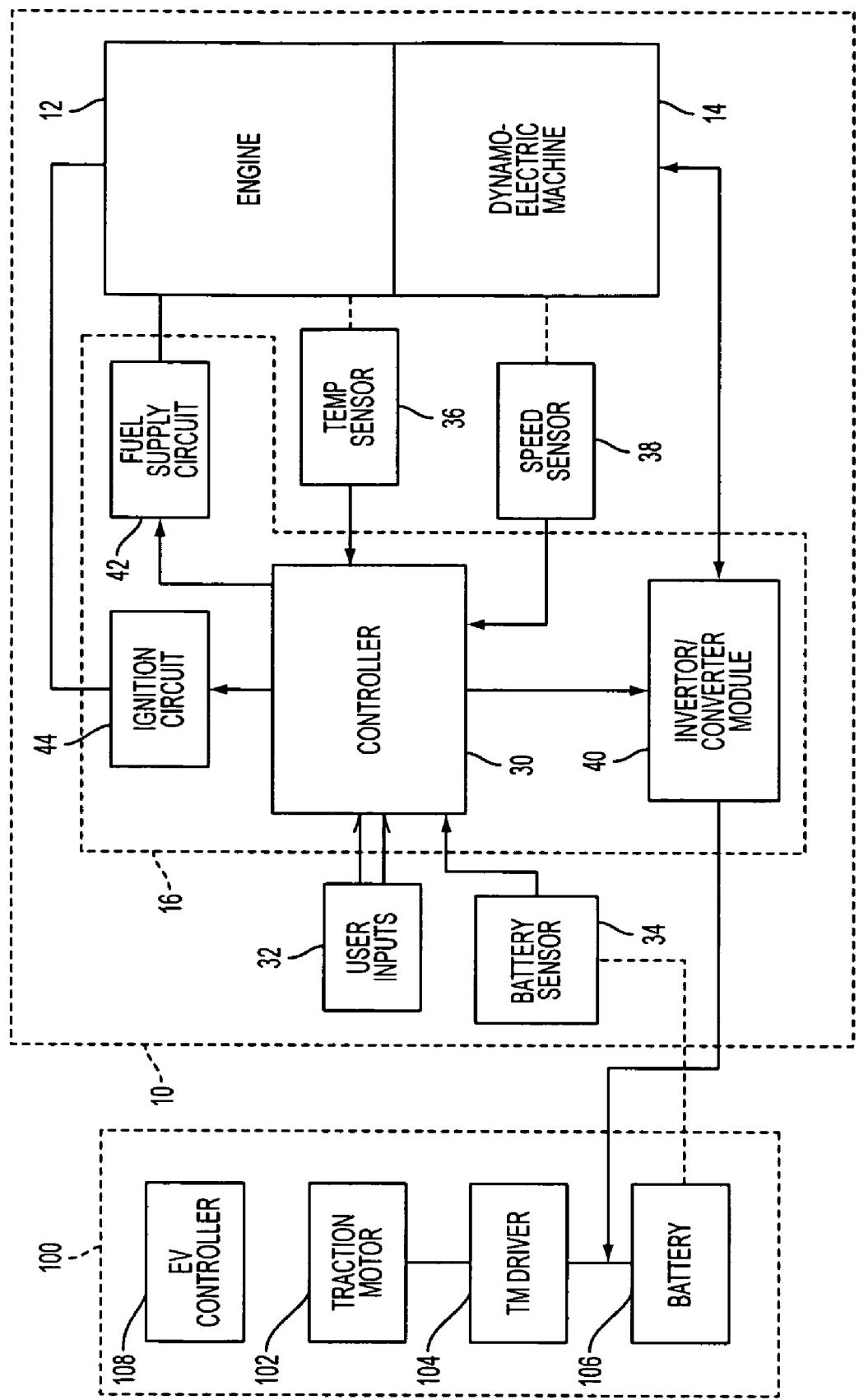
FIG. 5 is a block diagram of controlled operation of the range extender of FIG. 1, shown in relation to an electric vehicle.

FIG. 5 is a block diagram of an exemplary embodiment of the present invention, in which the range extender 10 is detachably connectable to a battery-powered vehicle 100 having a traction electric motor 102 driven by a traction motor driver 104 and powered by a battery 106. The traction motor 102 may be, for example, a permanent magnet DC brushless motor, such as disclosed in the above identified Maslov et al. patent. The high-voltage battery 106 can provide substantial electric power, for example, about 65 KW. The vehicle 100 is provided with an electric vehicle controller 108 for controlling typical operations of the electric vehicle. For example, in response to a torque request by the vehicle operator, the vehicle controller 108 may control the driver 104 to provide sufficient electric power from the battery 106 to the motor 102 to achieve the desired torque. The vehicle controller also may control the motor 102 to act as an electric generator to charge the battery 106 during a regeneration mode.

The range extender 10 is provided with an autonomous controller 30, such as a microcontroller, included within control system 16. The controller has a plurality of inputs, including user inputs 32 and inputs from battery sensor 34, engine temperature sensor 36 and speed sensor 38. The battery sensor provides an indication of the state of charge of the vehicle battery 106. Temperature sensor 36 provides indication of the engine temperature and speed sensor 38 provides a shaft speed feedback signal. The microcontroller can be programmable to control operations of the range extender in one or more modes. User inputs permit a user to select a particular operating mode or a manual operating mode. Reference is made to U.S. application Ser. No. 10/779,600, filed Feb. 17, 2004, and Ser. No. 10/868,349, filed Jun. 16, 2004, to Cho et al. for description of various operating modes.

Inverter/converter module 40 is detachably connectable to the vehicle 100 to provide a bidirectional transfer of power either from the battery 106 to the dynamoelectric machine 14 operating in the motoring mode during engine startup or from the dynamoelectric machine 14 operating in the generating mode to the battery 106. Under supervision of controller 30, module 40 operates to invert DC power from the battery 106 into 3-phase AC power for rotating the dynamoelectric machine 14 in the motoring mode, and converts 3-phase AC power generated by the dynamoelectric machine in the generating mode to DC power used for charging the battery 106 or driving the traction motor 102. Controller 30 is responsive to the range extender shaft speed as received from speed sensor 38 activate a switch circuit in the module 40 to activate generating operation when engine speed has obtained an appropriate level for driving the electrical machine 14. Controller 30 also provides output control signals to fuel supply circuit 42 and ignition circuit 44 during startup and turnoff phases of engine operation.

A compact structure is thus provided that enables a user to place the portable range extender into any battery-powered vehicle in order to extend its travel range by charging its battery or driving the vehicle instead of, or in combination with, the electric motor. For example, the range extender 10 may be placed in all-electric buses or vans to enable their use for longer trips. The range extender portability is also suitable for mounting in a trailer coupled to a vehicle. The range extender of the present invention may act as an auxiliary power unit not only for loads with substantial power consumption, such as trucks, recreational vehicles, etc., but may be used to supplement power requirements of any electrical load.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A portable range extender system capable of supplying energy to a vehicle, the system comprising:
   an internal combustion engine;

a dynamoelectric machine having a rotor coupled to the engine by a shaft, the dynamoelectric machine connectable to a power source for driving the shaft during a starting mode of the engine and for being driven by the engine via the shaft during a running mode of the engine;
a controller for operation of the dynamoelectric machine and engine, the controller having a user input permitting a user to select between a manual operating mode and one of a plurality of operating modes of the range extender; and
a portable enclosure containing the engine, dynamoelectric machine and controller, the enclosure containing a partition that divides the enclosure into two sections, a first section housing the dynamoelectric machine and the second section housing the engine;
wherein the dynamoelectric machine operates as a motor to drive the engine during a warm-up period of the engine and the dynamoelectric machine operates as a generator driven by the engine during a running mode of the engine.

2. A system as recited in claim 1, wherein said enclosure comprises a cool air inlet window in proximity to the dynamoelectric machine and air outlet window in proximity to the engine, the system further comprising cooling means, wherein cool air is forced from the inlet into the first section, through the dynamoelectric machine, through an opening in the partition to the second section and thus to the engine, and forced to the air outlet window.

3. A system as recited in claim 1, wherein said enclosure comprises a cover portion and a body portion, the cover portion being movable from contact with the body portion to provide user access to components contained in the enclosure.

4. A system as recited in claim 1, wherein the dynamoelectric machine further comprises a stator radially surrounding the rotor by a radial air gap, the stator comprising a plurality of ferromagnetically isolated separate core segments.

5. A system as recited in claim 2, wherein said cooling means comprises a first set of cooling fins mounted on the rotor of the dynamoelectric machine at an end thereof proximal to the air inlet window, a second set of cooling fins mounted on the rotor of the dynamoelectric machine at an end thereof distal to the air inlet window, and a third set of cooling fins mounted on the engine at an end thereof proximal to the opening in the partition.

6. A system as recited in claim 2, wherein the air outlet window of the enclosure is in communication with an engine exhaust pipe to provide egress of engine exhaust gas from the enclosure.

7. A system as recited in claim 5, wherein said first set of cooling fins is configured to direct air radially outwardly, said second set of cooling fins is configured to direct air radially inwardly, and said third set of cooling fins is configured to direct air radially outwardly.

8. A system as recited in claim 7, wherein the dynamoelectric machine further comprises a stator radially surrounding the rotor by a radial air gap, the stator comprising a plurality of ferromagnetically isolated separate core segments, and air is directed through separations between the core segments.

9. A system as recited in claim 3, further comprising means for sensing whether the cover portion is in proper contact with the body portion, and
wherein said controller is operative in response to a signal received from said sensing means to inhibit range extender operation.

10. A system as recited in claim 9, wherein said means for sensing comprises a contact switch.

11. A system as recited in claim 9, wherein said means for sensing comprises a magnetic switch.

12. A system as recited in claim 9, wherein said enclosure further comprises a latch for releasably securing the cover portion to the body portion and said latch comprises said means for sensing.

13. A range extender system capable of supplying energy to a vehicle, the system comprising:
an internal combustion engine;
a dynamoelectric machine having a rotor coupled to the engine by a shaft and a stator radially surrounding the rotor by a radial air gap, the stator comprising a plurality of ferromagnetically isolated separate core segments, the stator connectable to a power source for driving the shaft during a starting mode of the engine and the rotor being driven by the engine via the shaft during a running mode of the engine; and
a controller for operation of the dynamoelectric machine and engine, the controller having a user input permitting a user to select between a manual operating mode and one of a plurality of operating modes of the range extender system;
wherein the dynamoelectric machine operates as a motor to drive the engine during a warm-up period of the engine and the dynamoelectric machine operates as a generator driven by the engine during a running mode of the engine.

14. A system as recited in claim 13, further comprising:
an enclosure containing the engine, the dynamoelectric machine, and the controller, the enclosure having a partition that divides the enclosure into a first section housing the dynamoelectric machine and a second section housing the engine, the enclosure having a cool air inlet in proximity to the dynamoelectric machine and an air outlet in proximity to the engine; and
cooling means for directing air from the inlet, through the separations between the core segments of the dynamoelectric machine, and to the air outlet window.

15. A system, comprising:
a vehicle with an electric motor that drives the vehicle; and
a range extender having an internal combustion engine, a dynamoelectric machine, and a controller disposed within an enclosure of the range extender to define a range extender assembly, the range extender assembly detachably connected to the vehicle, the controller having a user input permitting a user to select between a manual operating mode and one of a plurality of operating modes of the range extender,
wherein the dynamoelectric machine operates as a motor to drive the engine during a warm-up period of the engine and the dynamoelectric machine operates as a generator driven by the engine during a running mode of the engine.

16. The system of claim 15, the enclosure including a partition that divides the enclosure into first and second sections, the first section housing the dynamoelectric machine and the second section housing the engine.

17. The system of claim 15, the dynamoelectric machine further comprising a stator radially surrounding a rotor by a radial air gap, the stator comprising a plurality of ferromagnetically isolated separate core segments.

18. The system of claim 15, the vehicle being an all-electric or a hybrid vehicle.

19. A system, comprising:
a vehicle with an electric motor that drives the vehicle; and
a range extender having an internal combustion engine, a dynamoelectric machine, and a controller, the dynamoelectric machine having a rotor coupled to the engine by a shaft and a stator radially surrounding the rotor by a radial air gap, the stator comprising a plurality of ferromagnetically isolated separate core segments, the stator connectable to a power source for driving the shaft during a starting mode of the engine and the rotor being driven by the engine via the shaft during a running mode of the engine, the controller having a user input permitting a user to select between a manual operating mode and one of a plurality of operating modes of the range extender, wherein the dynamoelectric machine operates as a motor to drive the engine during a warm-up period of the engine and the dynamoelectric machine operates as a generator driven by the engine during a running mode of the engine.

20. The system of claim 19, the range extender further comprising:

an enclosure containing the engine, the dynamoelectric machine, and the controller, the enclosure having a partition that divides the enclosure into a first section housing the dynamoelectric machine and a second section housing the engine, the enclosure having a cool air inlet in proximity to the dynamoelectric machine and an air outlet in proximity to the engine; and cooling means for directing air from the inlet, through the separations between the core segments of the dynamoelectric machine, and to the air outlet window.

21. The system of claim 19, the vehicle being an all-electric or a hybrid vehicle.

22. A method of supplying energy to an energy storage device, comprising:

connecting a range extender to a vehicle having the energy storage device;

selecting between a manual operating mode of the range extender and one of a plurality of operating modes of the range extender;

operating a dynamoelectric machine of the range extender to function as a motor to drive an internal combustion engine of the range extender during a warm-up period of the engine; and operating the dynamoelectric machine as a generator driven by the engine during a running mode of the engine to supply energy to the energy storage device.

23. The method of claim 22, the vehicle being an all-electric or a hybrid vehicle.

24. A method of supplying energy to an electric motor, comprising:

connecting a range extender to a vehicle driven by the electric motor;

selecting between a manual operating mode of the range extender and one of a plurality of operating modes of the range extender:

operating a dynamoelectric machine of the range extender to function as a motor to drive an internal combustion engine of the range extender during a warm-up period of the engine; and operating the dynamoelectric machine as a generator driven by the engine during a running mode of the engine to supply energy to the electric motor of the vehicle.

25. The method of claim 24, the vehicle being an all-electric or a hybrid vehicle.

26. A method of controlling a machine, comprising:

connecting a range extender having a controller to a vehicle;

selecting between a manual operating mode of the range extender and one of a plurality of operating modes of the range extender;

employing the controller to operate a dynamoelectric machine of the range extender as a motor to drive an internal combustion engine of the range extender during a warm-up period of the engine; and employing the controller to operate the dynamoelectric machine as a generator driven by the engine during a running mode of the engine to supply energy to the vehicle.

27. The method of claim 26, the vehicle being an all-electric or a hybrid vehicle.

28. A method of transferring energy, comprising:

connecting a range extender to a vehicle;

selecting between a manual operating mode of the range extender and one of a plurality of operating modes of the range extender;

transferring energy from the vehicle to operate a dynamoelectric machine of the range extender as a motor to drive an internal combustion engine of the range extender during a warm-up period of the engine; and operating the dynamoelectric machine as a generator driven by the engine during a running mode of the engine to transfer energy to the vehicle.

29. The method of claim 28, the vehicle being an all-electric or a hybrid vehicle.

30. A method of transportation, comprising:

connecting a range extender to a vehicle;

operating an electric motor of the vehicle to move the vehicle;

selecting between a manual operating mode of the range extender and one of a plurality of operating modes of the range extender;

supplying energy from a battery of the vehicle to operate a dynamoelectric machine of the range extender as a motor to drive an internal combustion engine of the range extender during a warm-up period of the engine; and operating the dynamoelectric machine as a generator driven by the engine during a running mode of the engine to supply energy to the vehicle.

31. The method of claim 30, the vehicle being an all-electric or a hybrid vehicle.

* * * * *